United States Patent
Gorissen et al.

(10) Patent No.: US 9,525,435 B2
(45) Date of Patent: Dec. 20, 2016

(54) COMPUTING DEVICE STORING LOOK-UP TABLES FOR COMPUTATION OF A FUNCTION

(71) Applicant: KONINKLIJKE PHILIPS N.V., Eindhoven (NL)

(72) Inventors: Paulus Mathias Hubertus Mechtildis Antonius Gorissen, Eindhoven (NL); Ludovicus Marinus Gerardus Maria Tolhuizen, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/396,971

(22) PCT Filed: Oct. 21, 2013

(86) PCT No.: PCT/IB2013/059491
§ 371 (c)(1),
(2) Date: Oct. 24, 2014

(87) PCT Pub. No.: WO2014/072855
PCT Pub. Date: May 15, 2014

(65) Prior Publication Data
US 2015/0067441 A1   Mar. 5, 2015

Related U.S. Application Data

(60) Provisional application No. 61/723,422, filed on Nov. 7, 2012.

(30) Foreign Application Priority Data

Feb. 27, 2013 (EP) ..................................... 13157006

(51) Int. Cl.
H03M 13/00 (2006.01)
H03M 13/37 (2006.01)
(Continued)

(52) U.S. Cl.
CPC .............. *H03M 13/37* (2013.01); *G06F 7/544* (2013.01); *G06F 8/41* (2013.01); *H04L 9/003* (2013.01);
(Continued)

(58) Field of Classification Search
CPC ..... G06F 2207/7219; G06F 7/544; G06F 8/41
See application file for complete search history.

(56) References Cited

U.S. PATENT DOCUMENTS 7,472,149 B2   12/2008   Endo
7,996,671 B2   8/2011    Chheda et al.
(Continued)

FOREIGN PATENT DOCUMENTS

| CN | 101123123 A | 2/2008 |
| JP | 2005208845 A | 8/2005 |
| WO | 2011080487 A1 | 7/2011 |

OTHER PUBLICATIONS

Chou et al: "White-Box Cryptography and an AES Implementation"; SAC 2002, LNCS 2595, 2003, pp. 250-270.
(Continued)

*Primary Examiner* — David Ton

(57) ABSTRACT

A computing device is configured to compute a function of one or more inputs, comprising look-up tables mapping input values to output values, wherein the inputs values have a bit size equal to a first code word bit size of a first error correcting code, such that any two input values that each differ at most by a first error threshold of bits with a same code word of the first error correcting code are mapped to respective output values that each differ at most by a second error threshold number of bits with a same code word of a second error correcting.

15 Claims, 8 Drawing Sheets

(51) Int. Cl.
*G06F 7/544* (2006.01)
*H04L 9/00* (2006.01)
*G06F 9/45* (2006.01)
*H04L 9/06* (2006.01)

(52) U.S. Cl.
CPC ....... *H04L 9/004* (2013.01); *G06F 2207/7219* (2013.01); *H04L 9/0631* (2013.01); *H04L 2209/16* (2013.01)

(56) References Cited

U.S. PATENT DOCUMENTS

| 8,700,915 | B2* | 4/2014 | Michiels | 455/41.1 |
| 2005/0259814 | A1 | 11/2005 | Gebotys | |
| 2008/0034270 | A1 | 2/2008 | Onishi et al. | |
| 2012/0002803 | A1* | 1/2012 | Adi | H04L 9/0866 380/28 |
| 2012/0093313 | A1* | 4/2012 | Michiels | H04L 9/002 380/255 |

OTHER PUBLICATIONS

Kleinosowski et al: "The Nano-Box Project: Exploring Fabrics of Self-Correcting Logic Blocks for High Defect Rate Molecular Device Technologies"; Proceedings of the IEEE Computer Society Annual Symposium on VLSI Emerging Trends in BSLI Systems Design (ISVLSI'04), pp. 19-24. 2004.

Marcel Medwed: "A Continuous Fault Countermeasure for AES Providing a Constant Error Detection Rate"; International Association for Cryptologic Research, vol. 20090315:020844, Mar. 2009, pp. 1-14.

Zhang et al: "A Special-Purpose Compiler for Look-Up Table and Code Generation for Function Evaluation"; 2010 Design, Automation & Test in Europe Conference & Exhibition, 1010, Dresden, Germany, IEEE, pp. 1130-1135.

* cited by examiner 510     1011        0110

COMPUTING DEVICE STORING LOOK-UP TABLES FOR COMPUTATION OF A FUNCTION

CROSS-REFERENCE TO PRIOR APPLICATIONS

This application is the U.S. National Phase application under 35 U.S.C. §371 of International Application No. PCT/IB2013/059491, filed on Oct. 21, 2013, which claims the benefit of U.S. Provisional Patent Application No. 61/723,422, filed on Nov. 7, 2012, and EP Application No. 13157006.1, filed on Feb. 27, 2013. These applications are hereby incorporated by reference herein.

FIELD OF THE INVENTION

The invention relates to a computing device configured to compute a function of one or more inputs, the inputs having an input bit-size, the device comprising a storage device storing one or more look-up tables used in the computation of said function, the look-up tables mapping input values to output values.

BACKGROUND OF THE INVENTION

The security of a computer implemented system depends on multiple factors. On the one hand there is the security of the underlying abstract protocol and cryptography. Once the cryptography employed is broken, the system will typically also be broken. On the other hand there is the security related to the implementation itself.

For example, it has long been known that computer systems leak some information through so-called side-channels. Observing the input-output behavior of a computer system may not provide any useful information on sensitive information, such as secret keys used by the computer system. But a computer system has other channels that may be observed, e.g., its power consumption or electromagnetic radiation; these channels are referred to as side-channels. For example, small variations in the power consumed by different instructions and variations in power consumed while executing instructions may be measured. The measured variation may be correlated to sensitive information, such as cryptographic keys. This additional information on secret information, beyond the observable and intended input-output behavior are termed side-channels. Through a side-channel a computer system may 'leak' secret information during its use. Observing and analyzing a side-channel may give an attacker access to better information than may be obtained from cryptanalysis of input-output behavior only. One known type of side-channel attack is the so-called differential power analysis (DPA).

There are other ways to attack a system. Related to the classic side-channel attack, are fault injection attacks. Here the underlying hardware is intentionally made to malfunction. Due to the malfunction the device will produce wrong answers. If the particular type of errors is related to secret information, then analyzing the errors may disclose secret information. In particular, light attacks also known as flash attacks are a particular powerful way to inject faults. In a light attack laser light is flashed on a circuit during computation to disrupt intermediate values.

For example, a known attack to the RSA signature algorithm injects transient faults in the target machine by regulating the voltage supply of the system. Attackers do not need access to the internal components of the victim chip, they simply collect corrupted signature outputs from the system while subjecting it to transient faults. Once a sufficient number of corrupted messages have been collected, the private key can be extracted through offline analysis.

One way to counter fault attacks is to verify the computations. For example, by performing critical computations twice. In the particular case of RSA signatures, the signature may be verified by the RSA verification algorithm. In this way a fault attack is detected and it is avoided that erroneous values leave the computing device.

An even stronger attack on a computer is so called reverse engineering. In many security scenarios attackers may have full access to the computer. This gives them the opportunity to disassemble the program and obtain any information about the computer and program. Given enough effort any key hidden say in a program may be found by an attacker.

Protecting against this attack scenario has proven very difficult. One type of counter measure is so-called white-box cryptography. In white-box cryptography, the key and algorithm are combined. The resulting algorithm only works for one particular key. Next the algorithm may be implemented as a so-called, lookup table network. Computations are transformed into a series of lookups in key-dependent tables. See for example, "White-Box Cryptography and an AES Implementation", by S. Chow, P. Eisen, H. Johnson, P. C. van Oorschot, for an example of this approach.

Both implementations of functionality in computer hardware and computer software are vulnerable to the above side-channel attacks. The problem is however most severe in software. Compared to hardware implementations, software is relatively slow and consumes a relatively large amount of power. Both factors favor side-channel attacks.

Attempts have been made to increase the resistance of computer programs against side-channel attacks by changing their compilation.

U.S. Pat. No. 7,996,671 suggests increasing the resistance of computer programs against side-channel attacks by improved compilation. Since power analysis attacks rely on measured power consumption, resistance is increased by compiling so as to reduce power consumption. The compiler predicts the compilation that is the most energy efficient and selects it. It is observed that energy consumption reduction increases the power noise/variation and improves side-channel resistance.

If the energy reduction approach alone is not enough to introduce enough power noise/variation, then the compiler approach that is used for energy optimization can be used to randomize the power cost in critical portions of codes such as cryptographic algorithms. This is accomplished at compile time by deliberately generating code with different power requirements.

Current approaches to the side-channel problem that introduce randomness in the computation have proved less than satisfactory.

SUMMARY OF THE INVENTION

It would be advantageous to address these and other security concerns. The attackers have observed the mentioned compilation based countermeasure against side-channel attacks may be somewhat successful in countering the passive side-channels, such as DPA, but not the active attacks such as fault attacks and reverse engineering.

A computing device is provided configured to compute a function of one or more inputs. The device is configured to obtain the one or more inputs as one or more encoded inputs. The device comprises a storage device storing one or more look-up tables used in the computation of said function, the look-up tables mapping input values to output values, input values of a look-up table having a bit size equal to a first code word bit size (n1) of a first error correcting code, the look-up table being constructed with respect to the first error correcting code, a second error correcting code, a first error threshold and a second error threshold, such that any two input values that each differ at most a first error threshold number of bits with a same code word of the first error correcting code, are mapped to respective output values that each differ at most a second error threshold number of bits with a same code word of the second error correcting code. The first error threshold is at least 1 and at most the error correcting capability (t1) of the first error correcting code, and the second error threshold is at most the error correcting capability (t2) of the second error correcting code.

An encoded input may be obtained by applying an encoding function to one of said inputs, the encoding function mapping an input to a corresponding code-word of an error correcting code. Optionally, the encoded input may be corrupted to a certain extent; up to the first threshold of bit errors corresponding to the first look-up table that will be applied to the input values may be added to the encoded input values. In general adding bit errors may be done by changing, i.e., flipping a bits, in this case up to a first error threshold number of bits. In some applications, the program will in fact receive encoded inputs directly. The compiler may be configured to produce an ancillary program to convert unencoded values to encoded values. The ancillary program may be used by other applications that need to supply the encoded input values.

Using encoded input values instead of the input values themselves contributes to the obfuscation of the program, i.e., increases the difficulty of reverse engineering the program. The stored look-up tables have error correcting properties. These properties may be exploited in two ways. All encoded input values that differ up to at most the error correcting capability (also referred to as 't') bits with a same code word are handled in the same way by the look-up table. Thus a fault attack causing at most 't' bit errors will not cause a security relevant error, say a key-correlated error. Fault attacks become increasingly more difficult with each additional error that must be injected. By performing computations using error correcting tables, fault attacks become harder to do. On the other hand, the look-up table need not give the same result for two inputs that belong to the same input value, i.e., are close to the same code word. Since the look-up table is resistant against errors, these errors may also be introduced on purpose. Reverse engineering is increasingly difficult when the fixed relation between values and encoding is disturbed. When error correcting tables are used a single input value may be represented by many encoded values. In particular automated reverse engineering which depends on finding correlations between input values, output values and internal variables will require data of significantly more runs to overcome this statistical hurdle. The two ways the error correcting tables oppose fault and reverse engineering attacks need exclude each other, both may be used at the same time.

Interestingly, the error correcting code need not be the same for each look-up table. The error correcting codes need not even have the same parameters for each look-up table. Using different error correcting codes is beneficial to obfuscation, but also greatly adds to the flexibility of the system. Typically a function implemented with the look-up tables uses a so-called network of tables. By allowing multiple different error correcting tables, these tables need not be of the same size; this greatly saves on the size requirements needed, since tables which could be small can actually be made small. In an embodiment of the device a function is implemented as network of tables, constructed with respect to multiple different first error correcting codes and multiple different second error correcting codes. In the look-up table network the used error correcting odes should fit: if the output of a first table is fed to a second table, the second error correcting code of the first table should be the first error correcting code for the second table.

Indeed, in an embodiment, the one or more look-up tables used in the computation of said function comprise a first and a second look-up table used in the computation of said function, the first look-up table being constructed with respect to a first first error correcting code and a first second error correcting code, the second look-up table being constructed with respect to a second first error correcting code and a second second error correcting code, wherein the first second error correcting code equals the second first error correcting code.

However, this is not needed: in an embodiment, the first error correcting code of a look-up table is the same as the second error correcting code of that look-up table. In an embodiment, all the first error correcting codes of the look-up tables are the same and the same as all the second error correcting codes of the look-up tables.

The first and second error thresholds allow trade-off to be made between fault resistance and increased obfuscation.

For example, in an embodiment, the second error threshold is zero. In this embodiment, any two input values that each differ at most a first error threshold number of bits with a same code word are mapped to a same second code word. This embodiment optimally protects against fault injections. Faults which are injected in intermediate values are automatically corrected as soon as any computation is performed on them. This type of look-up table also is best if intentional faults are inserted dynamically in the program, instead of fixed in the tables. Similarly, by choosing the first error threshold equal to the error correcting capability (t1) of the first error correcting code, error correcting capabilities are increased. In a preferred embodiment, these two choices are combined.

In an embodiment, the computing device is configured to compute the function in a so-called lookup table network. By applying a sequence of table loop-up accesses in the look-up tables stored in the storage device a sequence of intermediate results is obtained. The intermediate results include the encoded input values and the output values of the table look-up accesses in the sequence, one of the intermediate results being the encoded result of the function. The beneficial effects of the error correcting tables are stronger if they are applied to a larger part of a program. By implementing a function as a network of tables, the effects on obfuscation increase markedly.

Constructing the network of tables is easier if the first and second error correcting functions are the same for each one of the look-up tables in the network. In that case, an output value of one table may be directly used as an input value of another table. However, with some care the tables may have different error correcting codes. For example, one may make sure that the second error correcting code of one table is equal to the first error correcting code of another table. Furthermore, by transforming the identity operator one obtains converting tables that convert from one encoding to another.

For simplicity many of the examples will use one error correcting code both for receiving the inputs, for giving the outputs and for all intermediate values. However, it is noted that this is not needed, and indeed it may be beneficial to allow the increased complexity of different first and second error correcting codes, i.e., to obtain the additional obfuscation and/or obtain foot-print reduction of the stored look-up tables. It is not even needed that the first error correcting code and the second error correcting code have the same minimum distance, nor is this needed across different tables. However, it is convenient if all used error correcting codes have the same minimum distance, since this ensures a minimum protection against errors, while it avoids making tables larger than needed to meet that minimum protection.

An embodiment of the computing device is configured to compute a function of one or more inputs. The device comprises a storage device storing one or more look-up tables used in the computation of said function, the look-up tables mapping input values to output values, input values and output values having a bit size equal to the code word bit size, the look-up tables being constructed with respect to the error correcting code, such that any two input values that each differ at most 't' bits with a same code word are mapped to respective output values that each differ at most 't' bits with a further same code word. The value 't' is also referred to as the 'error correcting capability' of the code.

For example, the computing device is configured to obtain the one or more inputs as one or more encoded inputs, an encoded input being obtained by applying an encoding function to one of said inputs, the encoding function mapping an input to a corresponding code-word of a t-error correcting code, the code-words having a code word bit-size, larger than a bit-size of the inputs. An input before encoding has an input bit-size, and after encoding a code word bit size.

The function of the one or more inputs may be an implementation of a security application, say a signature or decryption function. In particular functionality which handles security sensitive values, such as a key, authorization, access, and the like, benefits from the error correcting tables.

Obtaining the encoded input may be done by the computing device itself by applying an encoding function to one of said inputs, e.g., by an encoding module. It may also be done outside of the computing device, in this case the computing device directly received the encoded inputs. Note that encoding with an error correcting encoding may well be combined with an obfuscating encoding, e.g., such as in known from white-box cryptography.

For example, if Y denotes the unencoded domain, i.e., plain (input) values. And X denotes the code word space. Let M be the embedding of a domain Y into a larger domain X, and let $M^{-1}$ be the mapping from the domain X to Y where a small error e in the value M(v) of X still maps back to the to v. Encoding an input value y, may be done by computing M(y). The latter may be done by applying an encoding function, say a linear matrix multiplication, and the like, but also by a look-up table. Let g be a function of Y to Y which obfuscates. Applying g hides the meaning of variables. This may be combined with the encoding as given above as follows: y is mapped to M(g(y)). For example, g may chosen at random, at least g is not the identity.

Using a tablized implementation of a function, e.g., obtained by a special compiler, or made by hand, will lead to a larger footprint. Moreover the since the encoding increases the size of values, the tables are larger than without the error correcting encoding. For many applications the benefits outweigh this increase in space. Some interesting codes to use, for the first and/or second error correcting code, are the following: [7, 4, 3], [11, 4, 5], [12, 8, 3], [16, 8, 5], [21, 16, 3]. These codes combine a relative low value of 't', i.e. 1 or 2, with an unencoded block size that relates well to binary architectures. However, there is no reason to restrict the unencoded input bit size (k) to powers of 2, although this is convenient. In the latter case, one could use codes like [9, 5, 3], [13, 5, 5], [10, 6, 3], [14, 6, 5] etc.

Use of codes having an even minimum distance is possible, although an odd minimum distance is preferred. This means codes like [8,4,4], [10,4,4] may also be used.

Using an even minimum distance (d) may be important for fault detection. With: d=2t one can correct (t−1) errors, and detect up to t bit errors. For example, error logic may be included that verifies if there are t errors. Also, when using a non-perfect code the error logic may detect uncorrectable bit patterns. When such problems are detected appropriate actions may be taken, e.g., aborting the process, raising an error etc.

Although linear codes are to be preferred since they will simplify the design of the compiler significantly, the linear structure does not lead to an improved look-up table. This means that non-linear codes may also be used, such as [14,7,5],[15,7,6],[15,8,5] en [16,8,6].

However, to keep tables small, it is preferred to keep n small, say 12 or below, or even below 11; and to keep the dimension small, say 8 or smaller, possibly 4.

An aspect of the invention concerns the construction of a look-up table, from a operator mapping bit-strings of input bit-size to bit-strings of input bit-size. These methods are preferably, computer implemented methods. The resulting look-up table is preferably stored on a computer readable medium.

In an embodiment of the method, a subset of all correctable bit strings of code word bit size (n1) are generated. The operator is applied to the decoding of the generated correctable bit string; the decoding being performed according to the first error correcting code. The result is encoded to a code word of the second error correcting code, possibly adding one or more errors. A look-up table is constructed in which the generated correctable bit string is mapped to the encoded to a code word including optional one or more errors. The number of bits in the unencoded input value of the operator is at most the dimension of the first error correcting code. The number of bits in the unencoded output value of the operator is at most the dimension of the second error correcting code.

To construct the error correcting look-tables, there are at least two basis approaches. In both approaches correctable bit strings of the same size as the code word size of the first error correctable code are constructed; the operator result corresponding to the correctable bit strings are computed; and the code word from the second error correcting code is found by encoding the operator result. The latter step possibly including adding bit errors, i.e., adding a correctable bit error. A look-up table is then constructed mapping the correctable bit strings to operator results.

The correctable bit strings of the same size as the code word size of the first error correcting code are constructed may found in at least two ways:

In a first approach the correctable bit strings are generated directly. For a perfect code this may simply be generating all possible bit strings of a given length. In a more advanced implementation this may be generating all possible bit strings of a given length but filtering out the decodable bit strings. Some special codes have special algorithms to generate the decodable bit strings.

In a second approach, uncoded bitstring of bit size equal to the dimension of the first error correcting code are generated. This may be done by directly generating all string of a given length. The generated bitstrings are then encoded to obtain code words of the first error correcting code. From the obtained code words the correctable bits strings may be obtained by adding correctable bit patterns. Adding correctable bit patterns may be adding at most first error threshold bit errors to the code word, i.e, changing at most first error threshold bits of the codeword.

For example, in an embodiment, correctable bit strings of code words are obtained by generating bit-strings having the same size as the first code-word bit size (n1) of the first error correcting code. In an embodiment all bit-strings of that size are generated. For example, in an embodiment, the correctable bit strings of code word are obtained by generating bit-strings having the same size as the first input bit size (k1), encoding the generated bit-string to a code word of the first error correcting code, generating all correctable error patterns, and applying the correctable error pattern to the encoded generated bit-string. In an embodiment, all bit-strings and/or correctable error pattern are generated.

The operator may be an elementary operator, such as an arithmetic operator or a logic operator. However, an operator may be complex operator, such as an expression involving multiple basic operators, or even an algorithm taking input values and producing output values. In particular the operator could be the function; but typically, the function requires the application of multiple operators.

Look-up tables obtainable by the methods for the constructing of a look-up table may be used in the computing device.

An aspect of the invention concerns a compiler for compiling a first computer program written in a first computer programming language into a second computer program. The compiler comprises a code generator to generate the second computer program by generating tables and machine language code, the generated tables and the generated machine language code together forming the second computer program, the generated machine language code referencing the tables. The compiler is configured to identify an arithmetic or logical expression in the first computer program, the expression depending on at least one variable, and the code generator is configured to generate one or more tables representing pre-computed results of the identified expression for multiple values of the variable and to generate machine language code to implement the identified expression in the second computer program by accessing the generated one or more tables representing pre-computed results. The one or more tables may be generated according to any one of methods of construction described herein.

The compiler is advantageous since it shields the programmer from the complexities associated from using error correcting tables. Especially when multiple error correcting codes are used the complexities becomes impossible to manage by hand.

An aspect of the invention concerns a method to compute a function of one or more inputs, the method comprising storing one or more look-up tables, the look-up tables mapping input values to output values, input values of a look-up table having a bit size equal to a first code word bit size (n1) of a first error correcting code, the look-up table being constructed with respect to the first error correcting code, a second error correcting code, a first error threshold and a second error threshold, such that any two input values that each differ at most a first error threshold number of bits with a same code word of the first error correcting code, are mapped to respective output values that each differ at most a second error threshold number of bits with a same code word of the second error correcting code, wherein the first error threshold is at least 1 and at most the error correcting capability (t1) of the first error correcting code, and the second error threshold is at most the error correcting capability (t2) of the second error correcting code, using the one or more look-up tables in computing the function comprising applying the one or more look-up tables to encoded values.

The computing device is an electronic device; it may be a mobile electronic device, such as a mobile phone, set-top box, computer, and the like.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings.

Figure 1:
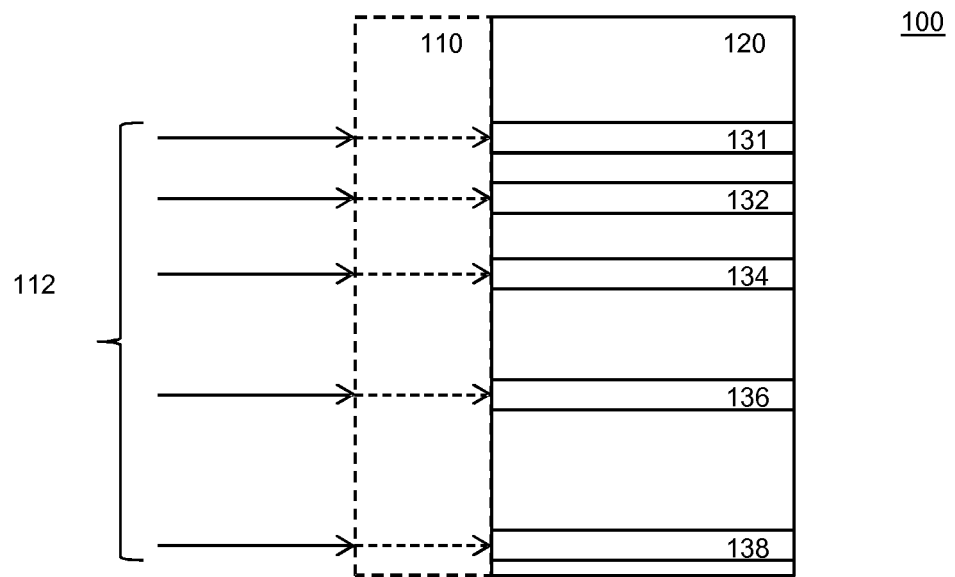
FIG. 1 is diagram illustrating an error correcting look-up table.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 explains error correcting look-up tables. A look-up table maps an input value to an output value by retrieving the output value from a storage device at a memory location controlled by the input value.

Look-up table 100 comprises output values 120. Each output value corresponds to an input value. The input values are schematically indicated at 110. Note that the input values need not necessarily be stored. Often the input values are implicit, from the context. For example, the input values typically have a fixed relation to the memory address at which an output value is stored. In the common situation the look-up table, lists all values in a particular range, and are listed in a sorted order. This is a situation in which the input values need not be stored in memory. Not storing input values saves storage space, typically by half. On the other hand explicitly storing input values has advantages too. For example, when input values are stored they the output values may be in any, even random, order. The output value can be found by looking-up the input value, slightly simplifying the code. Importantly, however, by explicitly storing the input values the look-up table may easily omit values. For example, if the look-up table represents some function or operator, then any unused input value may be omitted. Furthermore, as explained below, it also allows the use of encodings which do not use all possible bit-patterns. In this case storing the input values may even reduce storage requirements.

Look-up table 100 has a special property, which respect to an error correcting code C. The code C comprises $2^k$ code words, of n bits. Any two code words in C differ at least in d bits. The parameters of the code are referred to as a [n,k,d] code. The number t=floor ((d−1)/2) denotes the number bit errors that can be corrected. That is, if at most t bits in the code word flip, then there is a unique code word that is closest to the resulting bit string. The number k is referred to as the dimension of the code, the number d as the minimum distance. The use of the word dimension does not imply that a linear code is needed, although that is preferred. We will use the word dimension to indicate that the code comprises at least 2 to the power of the dimension code words.

The number t is referred to as the error correcting capability of the code. If it needs emphasis that the first error correcting code may be different from the second error correcting code, a subscript is added, thus referring to n1, k1, t1 and to n2, k2, t2. However, mostly we will provide examples in which the same code is used, in which case the number may be omitted. Generalizing examples, to two different codes once the example for two equal codes is given is straightforward.

Look-up table 100 has the property that any two input values that differ at most t bits from a same code word have corresponding output values that also differ at most t bits from a (possibly different) code word. In a special case the output values are all code words. In the latter case, the any two input values that differ at most t bits from a same code word have the same output values which are code words.

In FIG. 1, the inputs 112 differ at most t bits from a same code word. For example, if t=1 and n>=5, the five inputs 112 could have been obtained from one codeword and flipping 5 different bits; for example, if t>1 and n>3, the five inputs 112 could have been obtained from one codeword and flipping 3 bits, etc. The number of 5 inputs is an example, and could be more or less. Say 4 or 6 or 8 etc. Each input of the multiple inputs 112 corresponds to exactly one output of 131-138.

The inventors have found that the concept of error correcting tables is very versatile and has many applications. First of all, if a computing environment is susceptible to bit flips, as may happen in attacks, such as light attacks, an error correcting table will automatically correct a bit flip in the input. The same hold for less reliable hardware, or hardware used in hostile environments, e.g., high levels of radiation.

Another application is in code obfuscation. Since computations using error correcting tables are resistant against some errors, one may introduce errors on purpose to make it more difficult to reverse engineer the code. On may introduce errors on purpose by using error adding means, e.g., a random number generator controlling an XOR. However, the errors may also be introduced in the table itself. In this application, the output values are not code words, but code words in which a number of bits are flipped. The number of bits flipped must be less than or equal to the t, the error correcting bound.

To construct an error correcting table taking multiple inputs, one may use currying. One may also concatenate the inputs. Given a code C, the concatenation C||C is also a code.

Figure 2:
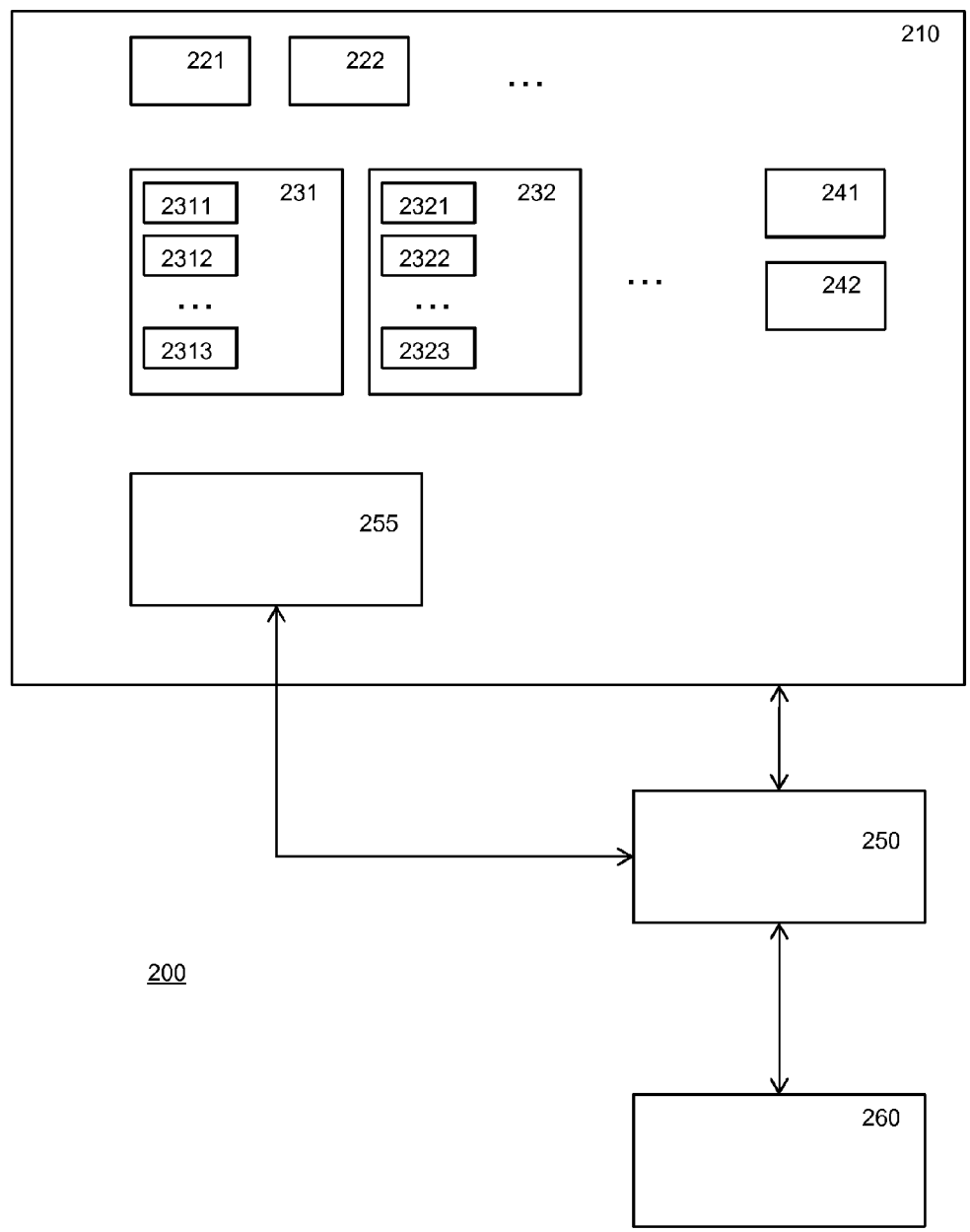
FIG. 2 is a block diagram illustrating a computing device.

FIG. 2 shows a computing device, having a storage device 210. Storage device 210 is typically one or more non-volatile memories, but may also be a hard disc, optical disc, etc. Storage device 210 may also be a volatile memory comprising downloaded or otherwise received data. Computing device 200 comprises a processor 250. The processor typically executes code 255 stored in a memory. For convenience the code may be stored in memory 210. The code causes the processor to execute a computation. Device 200 may comprise an optional I/O device 260 to receive input values and/or transmit results. I/O device 260 may be a network connection, removable storage device, etc.

Storage device 210 may comprise encoding look-up table 241, which take data words as input value and have code words, possibly including errors, as output values. For example, the input values have 'k' bits, whereas as the output values have 'n' bits, corresponding to an [n,k,d] code.

Storage device 210 may comprise decoding table 242 to decode a code word to its data bits. The table may be used for output over device 260.

Storage device 210 comprises single input look-up tables, as described above. Shown are tables 221 and 222. For example, these tables may have been constructed to represent monadic functions, such as negation.

Interestingly, it also possible to have error correcting tables having more than one input; the look-up tables mapping multiple input values to output values, input values and output values having a bit size equal to the code word bit size (n), the look-up tables being constructed with respect to the error correcting code; Two sets of multiple input values, which differ such that corresponding input values differ at most 't' bits from a same code word are mapped to a respective output values that each differ at most 't' bits from a further same code word. FIG. 2 shows multiple input look-up tables 231, 232.

A look-up table having multiple input values may be represented in various ways. One advantageous way is to use currying: by fixing one input value a look-up table for 'r' input values is reduced to an operator having only r−1 input values. Such smaller look-up tables are stored for all values of the fixed operand. Alternatively, the input values may be concatenated. The latter is convenient if not all bit strings are allowed as input values. FIG. 2 uses the currying approach: 2311-2323 are single input look-up tables.

In an embodiment, the computing device may work as follows during operation: computing device 200 receives input values. The input values are encoded, e.g. by using the encoding table 241. Thus the input values are obtained as encoded input values. Note that the input values could be obtained as encoded input values directly. Processor 250 executes a program 255 in memory 210. The program causes the processor to apply look-up tables to the encoded input values, or to resulting output values. Look-up tables may be created for any logic or arithmetic function thus any computation may be performed by using a sequence of look-up tables. In white box cryptography this used to obfuscate the program. In this case intermediate values are encoded for obfuscation and so are the look-up tables. Note that this may be combined advantageously, with the error correcting property.

At some point a result value is found. If needed the result may be decoded, e.g. using the decoding table 242. But the result may also be exported in encoded form. Input values may also be obtained from input devices, and output values may be used to show on a screen.

The computation is performed on encoded data words, i.e., code words possibly including up to t errors. The computation is done by applying a sequence of table look-up accesses. The input values used may be input values received from outside the computing device, but may also be obtained by previous look-up table access. In this way intermediate results are obtained which may then be used for new look-up table accesses. At some point one of the intermediate results is the encoded result of the function.

Figure 3:
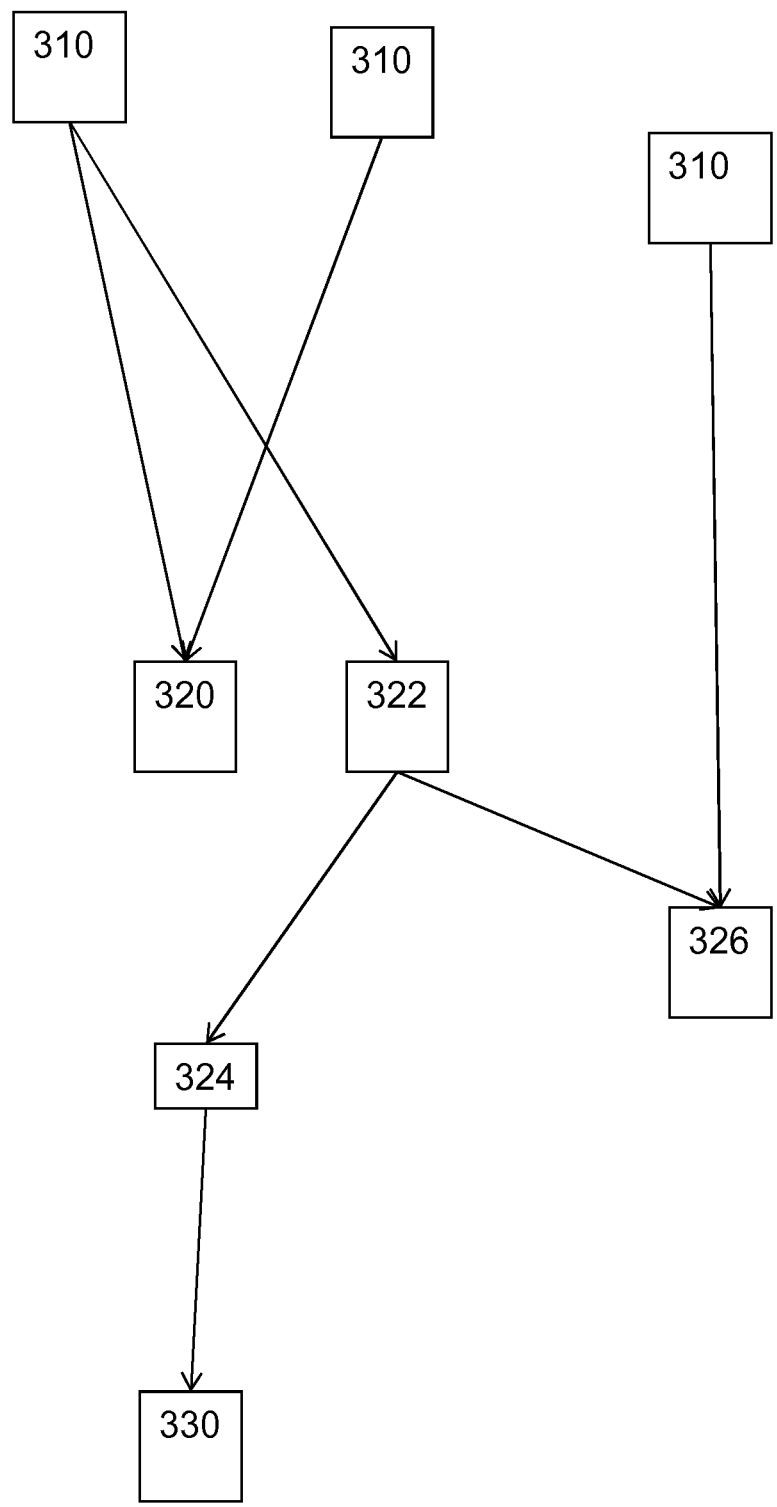
FIG. 3 is a block diagram illustrating a network of look-up tables.

FIG. 3 illustrates a network of tables. Most functions may be expressed as a network of tables. In particular any composition of arithmetic and logic operations may be so expressed. For example, the network of tables, may be an implementation, e.g. of a cipher. Shown are 8 tables of multiple tables. A table transforms an input value to an output value by table-lookup of the input value. Shown are three of the input tables 310, for receiving input from outside the function implementation. Shown is one of the output tables 330. The output tables 330 together form the output of the function implementation, e.g. by concatenation. Shown are four tables of the intermediate tables 320, who receive at least one input from another one of the tables, and who produce an output for use as an input for at least one other table. The tables 310, 320 and 330 together form a network. The cipher may be a block cipher; the block cipher may be configured for encryption or for decryption. The block cipher encrypts a block cipher, say AES. The implementation may be for a particular key, in which case the tables may depend on the particular key.

As an example, suppose table 322 represents an operator mapping k1 bits to k2 bits, then look-up table 322 has been constructed with respect to a first error correcting code [n1, k1, d1] and second error correcting code [n2, k2, d2]. The table will map n1 bits to n2 bits. An implementer has the choice to map all possible strings of n1 bits, regardless if the bit string is decodable or not, or to map only bit strings that are decodable. Using the first option, the table has size n2*2^n1 bits. Look-up table 324 who receives input values from table 322 represents an operator mapping k2 bits to k3bits. Look-up table 322 is constructed with respect to a first error correcting code [n2, k2, d2].

Look-up table 326 represents an operator having two inputs and one output. The construction of look-up tables for monadic operators may be extended to dyadic operators. For example, the second input may be 'curried out'; referring to the function transformation technique, currying is the technique of transforming a function that takes n multiple arguments (or an n-tuple of arguments) in such a way that it can be called as a chain of functions, each with a single argument. When this approach is used the look-up table 326 is implemented as multiple monadic look-up tables. On the other hand one may also generated correctable bit strings for each input and concatenate the results. In this way the look-up table is generated directly, and one single but larger look-up table is obtained. Although, the layout of the look-up tables may differ based on the construction, they have equal size and the same properties. Note that it is not necessary that the multiple input values are encoded according to the same error correcting code.

Figure 4:
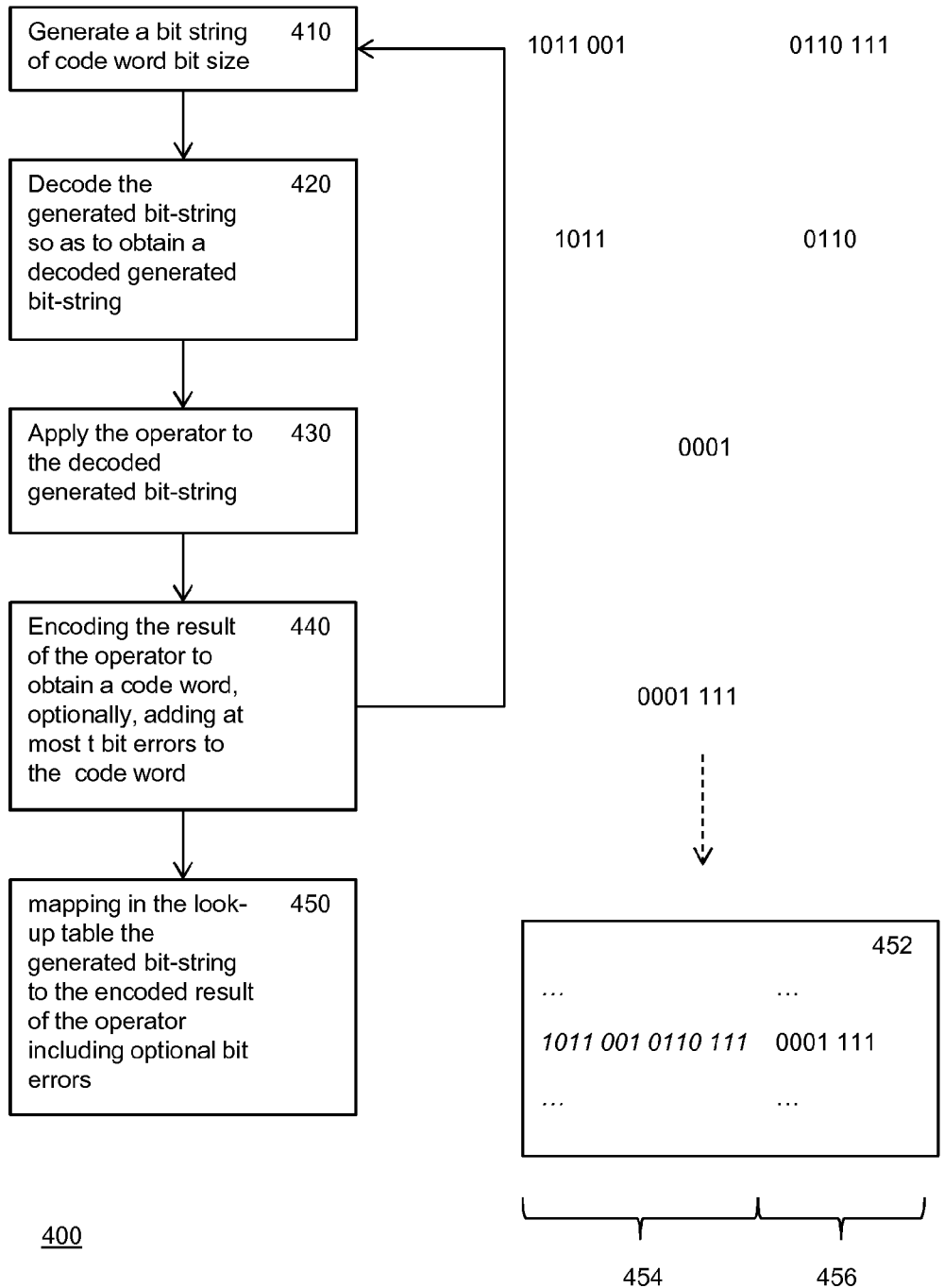
FIG. 4 is a flowchart illustrating a method to generate a lookup table for an operator.

FIG. 4 shows a method 400 to create error correcting functions. In the examples for FIGS 4 and 5, below we will use the [7,4,3] Hamming code. The code words are 7 bits long, encode 4 data bits. The code can correct a single error, i.e. t=1. We will use a construction in which code words have the form d1 d2 d3 d4 p1 p2 p3, here d1-d4 are data bits, p1=d1+d2+d4, p2=d2+d3+d4, p3=d1+d3+d4 are parity bits, and + denotes modulo two addition.

It is assumed that an operator is given for which an error correcting look-up table is desired. We will assume the function as two inputs, but 1 or more than 2, is possible. The operator may be common operators, like plus, mod, mul, and the like. But the operator may also be specific to an application, say an s-box of AES.

In the discussion below we will assume that the operator is a binary operator, taking two input values. As an example, the arithmetic addition is used. To keep the example manageable, the input values are 4 bits wide and encoded input values are 7 bits wide. In practice much larger input values and/or encodings may be used, which will accordingly lead to much larger tables.

In step 410 bitstrings of code word bit size (n) are generated. The generated bit strings, are possible input values to the final look-up tables. In the example, the strings 1011001 and 0110111 are generated. Note that the former is code word, but the latter is not. The generated bit strings are decoded, e.g., using an error correcting algorithm, so as to obtain a decoded generated bit-string. The decoded strings are of input value bit size (k), here 4 bit. Note that the error in the second generated bit string has been corrected. In this case, i.e. with the [7,4,3] Hamming code, a so-called perfect code is used. Perfect codes have the advantage that any generated bit string may be decoded to a unique decoded bit string. Non-perfect codes may be used; in this case, a tie breaker is used to choose a decoded bit string from the decoded bit strings that come closest. The tie breaker is deterministic, for example it may impose an ordering, say a lexicographic ordering. Alternatively, some input strings may not be decoded, but instead a "decoding error" is reported and appropriate action is taken. This may also be notes in the table, for example, non-decodable bit-string may given as output for a non-decodable input-string. Preferably, the non-decodable bit-string is random to avoid inadvertently introducing key correlations, etc.

The operator is applied to the result of the decoding of the generated bit-string. In this case two bit-strings have been generated, and the operator is applied to both of them. In this case the addition on 4 bit is performed. The result is encoded to obtain a code word. Optionally, up to at most t bit errors may be added to the code word. In this case one bit of the code word may be flipped. Finally, the look-up table is constructed so that the generated bit-string is mapped to the encoded result of the operator including optional bit errors.

The process is repeated until all desired bit string have been generated. Typically, all bit strings of code bit size (n) are generated in order. In case the operator has multiple inputs, then multiple bit strings are generated.

In this example, the method may generate all combination of two strings of 7 bits. So all 2^14 bit strings are generated.

The results are listed in look-up table 452. At the left side, indicated at 454 are input values, and at the right side at 456 are the corresponding output values. Note that the input values need not necessarily be listed explicitly. Especially, if all bit strings are generated, then the input side may be omitted.

Figure 5A:
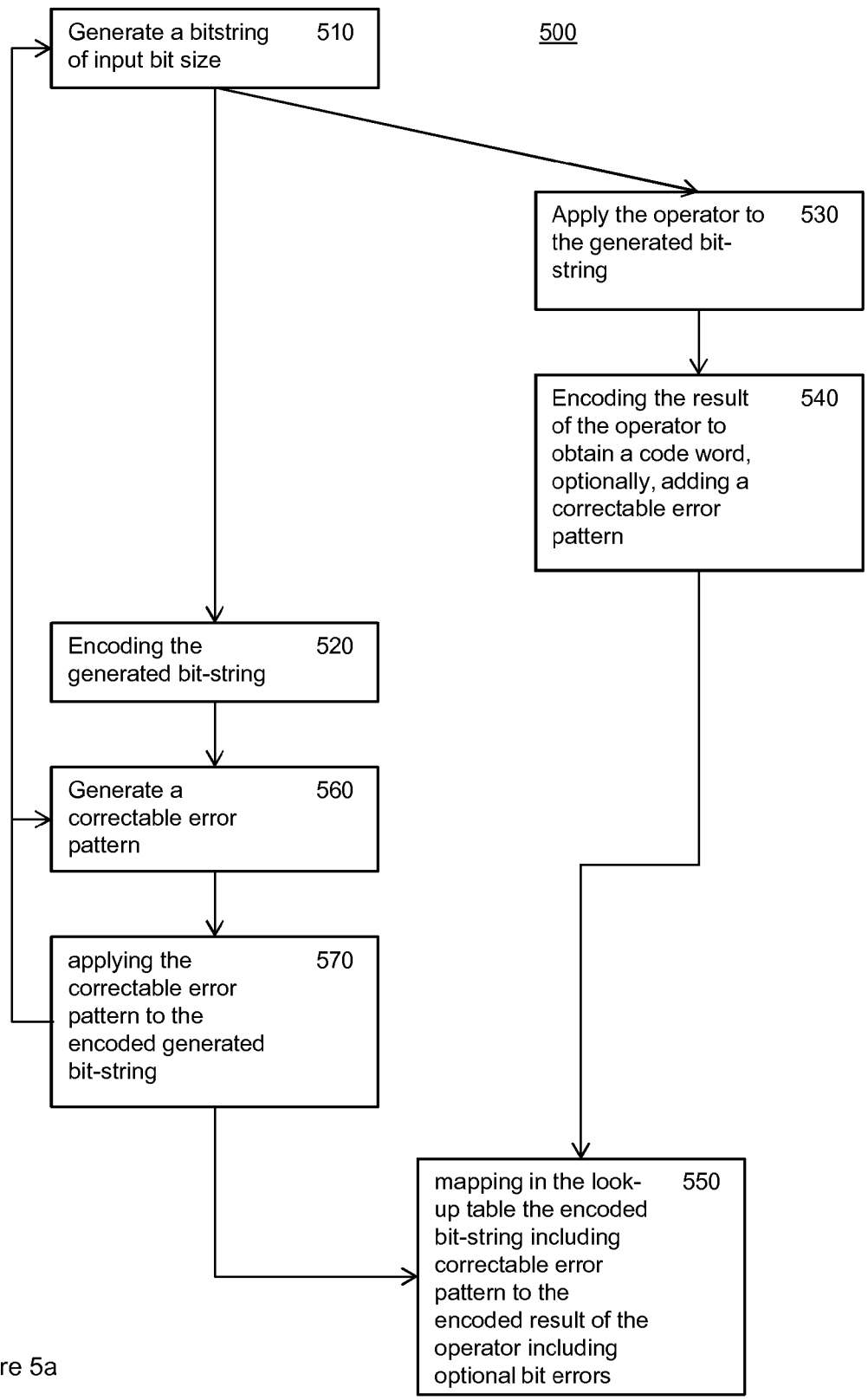
FIG. 5 is a flowchart illustrating a method to generate a lookup table for an operator.
FIG. 5b shows exemplifying values corresponding to figure 5a, FIG. 6 is a flowchart illustrating a compile.

FIG. 5a shows an alternative way of constructing error correcting tables. FIG. 5b, shows how the same table may be constructed, by showing how the same table entry may appear in the final look-up table as in FIG. 4.

In step 510 bit strings of input bit size (k) are generated. The generated bit strings are used in step 530 by applying the operator to the generated bit string and encoding the result in step 540. As in FIG. 4, optionally intentional errors (up to t) may be added to the code word. The generated bit strings are also used in step 520 to generated the encoding, i.e., the encoding as a code word. In step 560 correctable error patterns are generated. It is not necessary that all possible input values are represented by the look-up table. Instead one may restrict the input values to code words plus a limited set of correctable input values. If the code is perfect and the set of correctable input values equals all patterns with up to t one bits, and the rest zero. The result is the same. However, one may chose to add less than t errors. If the code is non-perfect and the set of correctable input values equals all patterns with up to t one bits, and the rest zero, the set of input values will be strictly smaller than all possible bit strings. There should be correspondence between the correctable bit patterns added in step 560 and the error added in step 540.

Both in FIG. 4 and FIG. 5, a subset of all correctable bit strings of code word bit size (n) are generated, the operator is applied to the result of decoding the generated correctable bit string, the result is encoded to a code word, possibly adding one more errors. A look-up table is constructed in which the generated correctable bit string is mapped to the encoded to a code word including optional one or more errors.

Figure 6:
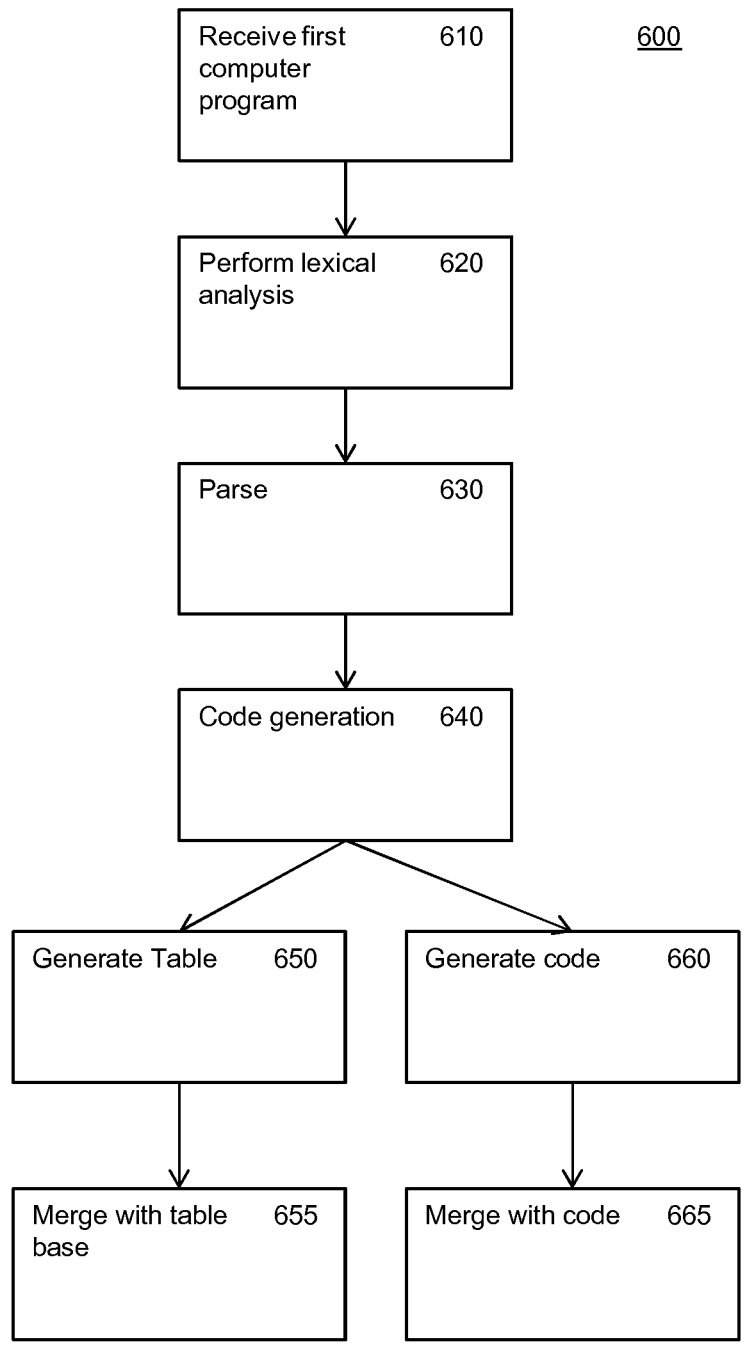

FIG. 6 illustrates as flow chart a compiling method 600. In step 610 a first computer program is received by a receiver. In step 620 a lexical analysis is performed, e.g., to identify tokens, by a lexical analyzer. Possibly processing such as macro expansion is also done. In step 630 the program is parsed by a parser. For example, the parser generates a parsing tree according to a formal grammar of the programming language of the first program. The parser identifies the different language constructs in the program and calls appropriate code generation routines. In particular, an operator or multiple operators are identified. In that case, in step 640 code generation is done by a code generator. During code generation some code is generated and if needed accompanying tables. The accompanying tables are error correcting tables. The generated code does not need, and generally will not, contain the operator as it is replaced by one or more look-up tables. For example, the parser will identify and add operation and translate this into a look-up table for the add instruction and in generated code for applying the look-up table to the correct values.

In step 655 the generated tables are merged to a table base, since it may well happen that some tables are generated multiple times, in that case it is not needed to store them multiple times. E.g. an add-table may be needed and generated only once. When all code is merged and all tables are merged the compilation is finished. Optionally, there may be an optimization step.

Typically, the compiler uses encoded domains, i.e., sections of the program in which all value, or at least all values corresponding to some criteria, are encoded, i.e., have code word bit size (n). In the encoded domain, operations may be executed by look-up table execution. When the encoded domain is entered all values are encoded, when the encoded domain is left, the values are decoded. A criterion may be that the value is correlated, or depends on, security sensitive information, e.g., a cryptographic key.

An interesting way to create the compiler is the following. In step 630 an intermediate compilation is done. This may be to an intermediate language, e.g. register transfer language or the like, but may also be a machine language code compilation. This means that for steps 610-630 of FIG. 6 a conventional compiler may be used, which is does not produce error correcting tables. However in step 640 code generation is done based on the intermediate compilation. For example, if machine language code was used, each instruction is replaced by a corresponding operator free implementation of that instruction, i.e., a table-based implementation of that instruction. This represents a particular straightforward way to create the compiler. FIG. 6 may also be used to generate a compiler that produces not machine language but a second programming language.

In an embodiment, the compiler is a compiler for compiling a first computer program written in a first computer programming language into a second computer program, the compiler comprises a code generator to generate the second computer program by generating tables and machine language code, the generated tables and the generated machine language code together forming the second computer program, the generated machine language code referencing the tables, wherein the compiler is configured to identify an arithmetic or logical expression in the first computer program, the expression depending on at least one variable, and the code generator is configured to generate one or more error-correcting tables representing pre-computed results of the identified expression for multiple values of the variable and to generate machine language code to implement the identified expression in the second computer program by accessing the generated one or more tables representing pre-computed results. Ideally, the machine language code generated to implement the identified expression does not contain arithmetic or logic machine instructions itself, at least no arithmetic or logic machine instructions related to sensitive information.

This lowers, side-channel leakage of the second computer program is lower because it does contain fewer arithmetic or logic operations. Ideally all arithmetic and logical expressions and sub-expressions in are replaced by table accesses. Since those instructions which constitute the arithmetic or logical expression or sub expressions are absent they cannot leak any information. The table is pre-computed; the power consumed to perform the arithmetic or logical behavior enclosed in the table is not visible during execution of the program. Because the table is error correcting the program is also more resistant against fault injection attacks. If the intentional errors are added in the program, either dynamically during execution or in the look-up table, the relation between an internal variable and an external result is further obfuscated, thus making reverse engineering more difficult.

Figure 7:
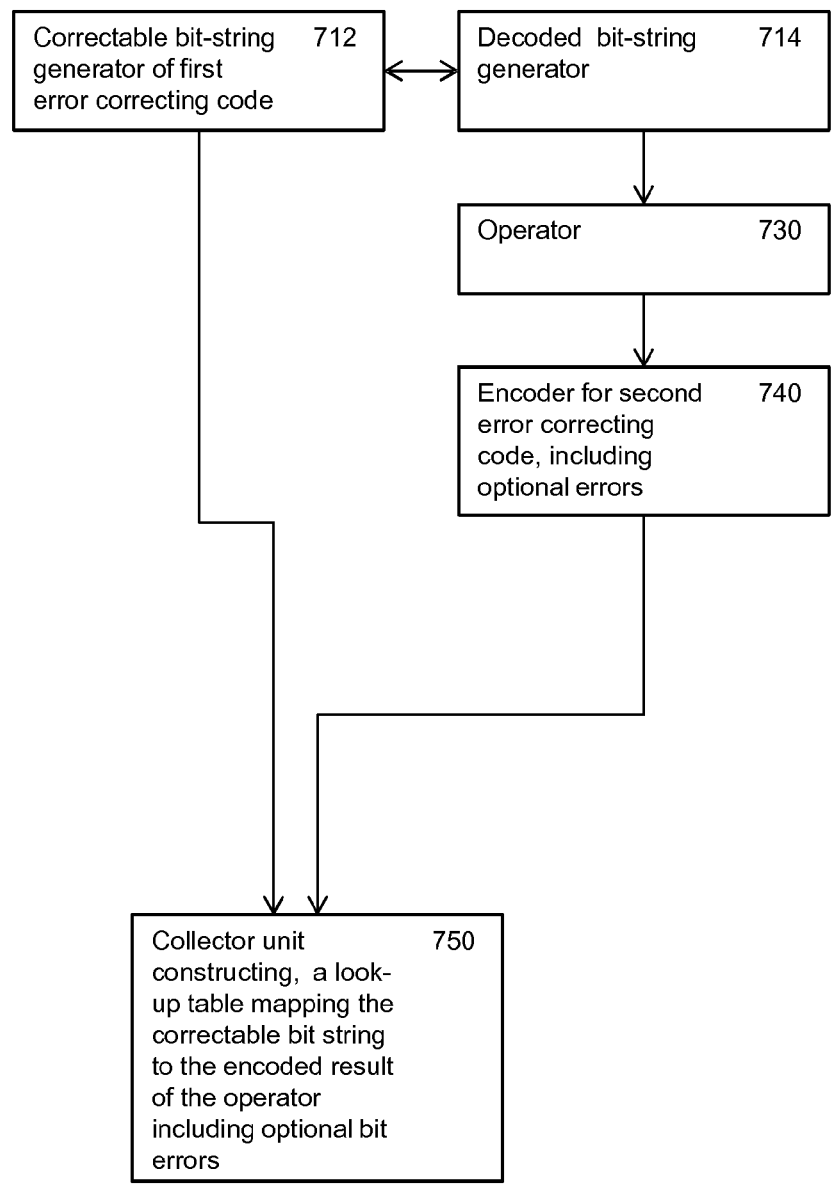
FIG. 7 is a block diagram illustrating a device for constructing a look-up table.

FIG. 7 shows a device constructing a look-up table 700. The device comprises a correctable bit-string generator 712 and a decoded bit string generator 714. Generators 712 and 714 work together to produce all strings that the look-up table should accept as input, i.e., the correctable bit strings, and the corresponding unencoded strings. Generator 712 produces strings of code word bit size (n1). Generator 714 produces strings of operator input bit size (k1). Both generators correspond to a first error correcting code. The pair may use any of the approach for constructing a look-up table as described herein.

The output of generator 714 is used by operator 730. Operator 730 is configured to perform an operator on the unencoded, i.e. decoded, bit string. The output of Operator 730 has k2 bits. Size k1 may equal k2. The result of the operator is encoded for a second error correcting code by encoder 740. Finally, collector 750 collects the correctable bit strings received from generator 712 and the corresponding encoded results of encoder 740, to produce a look-up table. If the relationship between an input to the resulting look-up table and the location of the output may easily be obtained, for example, because the collector actually includes all bit strings of size equal to the code word size of the first error correcting code, then the correctable bit strings need not be included in the look-up table.

The collector may add the some or all of the bit errors. The locations on which bit errors are added may depend on the correctable string, e.g., if the input string has a bit error in position i.e., a bit error is added in position i+1 in the second error correcting code.

Below a further refinement is given of an embodiment. The most common instruction in a program are operations and storing the result thereof. These operations include well known operations like addition (+), subtraction (−), multiplication (*), etc. The compiler targets these instructions, that is, it decomposes the expression written in some high level language into these known operations. Tables may be used for all involved operations, both the operations in programs, and if a VM is used also for the operations of the VM the program is executed on. Security may be further improved by endowing these tables with special features or properties.

For every operation, tables may be used. The table is defined according to the operation. Without the encoding, for instance, for a monadic operator Opm table$_{Opm}$ [x]==Opm(x) or for a dyadic operator Opd table$_{Opd}$ [x][y]==Opd(x,y). Note, that for a non-monadic operation the compiler can implement the access to the table as multiple accesses, a process known as Curry. That is X=table$_{Opd}$[x] followed by X[y]. Note: memory wise, for a data path of 8-bits, 14 dyadic operators, would require a memory usage equal to 1 megabyte, which is considered acceptable. Note that some or all tables may be stored in ROM and some or/all tables may be stored in other memory, whether volatile or non-volatile. Adding error correcting encoding may be done by the substituting the encoding in the above formula.

The unity of compiler/linker and VM is maintained by, replacing the operation usage, by a table access of the operation. The underlying platform need only be used for jump instructions and writes/reads from/to registers and memory.

In a more advanced embodiment, compiler could implement complete expressions as tables. For instance the expression: $X^2+Y^2$ can be implemented through two multiplications and one addition, resulting in at least three operations (or more if Curried). However, it could also be implemented as a table of $X^2+Y^2$ and be compiled to an access of this table. This would result in one (two if Curried) table accesses.

If a VM is used for execution of the compiled program, then the unity between compiler/linker and VM can be maintained by passing the tables to the VM. Labeled tables become output of the compiler and input to the VM. In the code provided by the compiler, these labels are then referred to. This may be an improvement memory wise, since tables of unused operations may be omitted. In an embodiment the compiler comprises an expression unit for identifying the first program an expression that assigns a value to one, two or multiple numeric inputs, the code generator being configured to generate a table representing the result of the expression for all values of the numeric inputs. Interestingly, there need the expression need not be equal to an existing machine code instruction.

Interestingly, a virtual machine adapted to execute a program in a particular VM programming language may be compiled to use error correcting tables. This in itself will impart some of error correcting properties on any program that is executed on the VM. However, also the program may be obtained by compiling a program in some further language towards the VM programming language. The latter compilation may also be compiled to use error correcting tables.

For example, one may use the tabelised instructions of the virtual machine, extended with error correction, to implement the VM itself. We explain this for extending the add instruction with an error correcting mechanism. Other instructions can be treated similarly.

First step may be to add the property of error correcting to the instruction, in the present case to the add_instruction. Let M be the embedding of a domain Y into a larger domain X, and let $M^{-1}$ be the mapping from the domain X to Y where a small error e in the value M(v) of X still maps back to the to v. Short $M^1(M(v) \oplus e)=v$. Here $\oplus$ denotes the addition in X. Typically, X consists of binary strings of equal length, $\oplus$ denotes bitwise modulo two addition of strings, and an error e is "small" if has few non-zero components (or, in coding parlance, if it has small Hamming weight). We denote by E the set of errors we wish to correct, and the set $\{M(v) \oplus e | v \in Y, e \in E\}$ by S. The error correcting coding is designed in such a way that each element s in S can be written in a unique way as $s=M(v) \oplus e$ with v in Y and e in E; we then have that $M^1(s)=M^1(M(v) \oplus e)=v$. For elements x in X that are not in S, $M^1(x)$ is not defined.

As a toy example, we take Y={0,1,2,3}, X={0,1}$^5$, and E={00000,10000,01000, 00100,00010,00001} (so we wish to correct one bit error). We define M by M(0)=00000, M(1)=01110, M(2)=10101 and M(3)=11011.

Clearly, we have that $M(0) \oplus E = E = \{00000, 10000, 01000, 00100, 00010, 00001\}$ $M(1) \oplus E = \{01110, 11110, 00110, 01010, 01100, 01111\}$ $M(2) \oplus E = \{10101, 0010111101, 10001, 10111, 10100\}$.

$M(3) \oplus E = \{11011, 01011, 10011, 11111, 11001, 11011\}$.

By inspection, we see that each element of S={M(u) $\oplus$ e|u $\in$ Y, e $\in$ E}{ } can be written in a unique way as M(u)$\oplus$e with u in Y and e in E. The set S thus is the set decodable bit strings.

There are eight elements of X that are not in S (viz. 11000,10110,01101,00011, 10010, 11100,00111,01001); $M^{-1}$ is not defined for these eight elements.

Similar to the obfuscation approach we now introduce:

add(x, y)==M(M$^1$(x)+M$^1$(y))

for all x and y in S.

The function add(x,y) is not defined if at least one of x and y is not in S. It is envisioned that whenever add(x,y) is called with such invalid input, this instruction is not executed and an error sign occurs.

In this way we extend the original add with error correcting properties and note that the expression apart from O or M is equal.

In the toy example, numbers were mapped that can be represented by two bits to strings of five bits so as to enable correction of a single bit. In general, numbers than can be represented by k bits can be encoded to bit strings of length k+r so that one error bit error can be corrected, where r is such that $k+r \leq 2^r-1$. So for example, for k=8-bits numbers, we can get by with r=4 redundant bits; for k=32 bits number, we can get by with r=6 redundant bits. In the latter the encoded strings have length 38, the set E has 39 elements and the memory size would be multiplied with a factor 39.

It is noted that many different ways of executing the method described herein are possible, in particular those described in the claims and/or with reference to FIGS. 4, 5, and 6. This will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method. For example, steps 520 and 530, or 620 and 630, etc. may be executed, at least partially, in parallel. Moreover, a given step may not have finished completely before a next step is started.

A method according to the invention may be executed using software, which comprises instructions for causing a processor system to perform method 400, 500 or 600. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMERALS 100 a look-up table
110 Inputs to the table (not actually stored in memory)
112 multiple inputs that differ at most 't=floor ((d−1)/2)' bits from a codeword
120 table contents,
131-138 table results for inputs 112
200 a computing device
210 a storage device
221, 222 single input look-up tables
231, 232 multiple input look-up tables
2311-2323 single input look-up tables
241 encoding look-up table
242 decoding look-up table
255 machine language code
250 a computer processor
260 I/O device
310 an input table
320 an intermediate table
330 an output table
452 a look-up table
454 input part
456 output part
552 look-up table
700 device for constructing a look-up table
712 correctable bit-string generator
714 decoded bit string generator
730 operator
740 encoder for a second error correcting code
750 collector

The invention claimed is:

1. A computing device configured to compute a function of one or more inputs, the device comprising:
a storage device configured to store one or more look-up tables used in the computation of said function, the look-up tables mapping input values to output values, the look-up table being constructed with respect to a first error correcting code, a second error correcting code, a first error threshold and a second error threshold, such that any two input values that each differ in at most a first error threshold number of bits from a same code word of the first error correcting code, are mapped to respective output values that each differ in at most a second error threshold number of bits from a same code word of the second error correcting code, wherein
the first error threshold is at least 1 and at most an error correcting capability (t1) of the first error correcting code, and the second error threshold is at most an error correcting capability (t2) of the second error correcting code.

2. The computing device as in claim 1, wherein the first error correcting code is the same as the second error correcting code.

3. The computing device as in claim 1, wherein the first error threshold equals the error correcting capability (t1) of the first error correcting code.

4. The computing device as in claim 1, wherein the second error threshold is zero.

5. The computing device as in claim 1, wherein the device is configured to obtain the one or more inputs as one or more encoded inputs, an encoded input being obtained by applying an encoding function to one of said inputs, the encoding function mapping an input to a corresponding code word of an error correcting code, optionally adding up to a first error threshold number of bit errors.

6. The computing device according as in claim 1, wherein the computing device is configured to:
compute the function by applying a sequence of table look-up accesses to a sequence of intermediate results, the intermediate results including encoded input values and the output values of the table look-up accesses in the sequence, one of the intermediate results being an encoded result of the function.

7. The A-computing device according to claim 1 wherein at least one of the first or second error correction code is one of the following:
[7,4,3], [11,4,5], [12,8,3], [16, 8,5], [21,16,3] and [9,5,5], [10,6,3], [14,6,5] and [8,4,4], [10,4,4].

8. The computing device according to claim 1, wherein a look-up table of the one or more look up tables, has been constructed from an operator mapping bit-strings of input bit-size (k) to bit-strings of input bit-size(k) by:
generating bit-strings, the generated bit strings having a same size as a code word bit size (n1) of the first error correcting code, the first error correcting code having a dimension of at least the input bit size (k1) and
for each decodable generated bit string,
decoding the generated bit string so as to obtain a decoded generated bit string, the decoding corresponding to the first error correcting code,
applying an operator to the decode generated bit string, and
encoding a result of the operator to obtain a code word of a second error correcting code, optionally, adding at most a second error threshold number of bit errors to the code word, the second error threshold number being at most an error correcting capability (t2) of the second error correcting code, the second error correcting code having a dimension of at least an output bit size (k2) and
mapping in the look-up table the decodable generated bit string to the encoded result of the operator including optional bit errors.

9. The computing device according to claim 8, wherein the operator is a bijection.

10. The computing device according to claim 8, wherein the operator is the identity.

11. A method of constructing a look-up table, for an operator mapping bit strings of an input bit-size (k1) to bit-strings of a output bit-size (k2), the method comprising:
generating bit-strings, the generated bit strings having a same size as a code-word bit size (n1) of a first error correcting code, the first error correcting code having a dimension of at least the input bit size (k10, and
for each decodable generated bit-string,
decoding the generated bit-string so as to obtain a decoded generated bit-string, the decoding corresponding to the first error correcting code,
applying an operator to the decoded generator bit-string, and
encoding a result of the operator to obtain a code word of a second error correcting code, optionally, adding at most a second error threshold number of bit errors to the code word, the second error threshold number being at most an error correcting capability (t2) of the second error correcting code, the second error correcting code having a dimension of at least the output bit size (k2), and
mapping in the look-up table the decodable generated bit string to the encoded result of the operator including optional bit errors.

12. A method of constructing a look-up table, for an operator mapping bit-strings of input bit-size (k1) to bit-strings of output bit-size (k2), the method comprising:
generating bit-strings having a same size as the input bit size (k1),
for each generated bit-string,
applying an operator to the generated bit-string, and
encoding a result of the operator to obtain a code word of a second error correcting code, optionally, adding a correctable error pattern to the code word, the second error correcting code having a dimension of at least the output bit size (k2),
encoding the generated bit-string to obtain a code word from a fist error correcting code, the first error correcting code having a dimension of at least the input bit size (k1), and
for each correctable error pattern,
applying the correctable error pattern to the encoded generated bit string to obtain encoded input values,
mapping in the look-up table the encoded input values to the encoded result of the operator including optional bit errors.

13. A compiler for compiling a first computer program written in a first computer programming language into a second computer program,
the complier comprises a code generator to generate the second computer program by generating tables and machine language code, the generated tables and the generated machine language code together forming the second computer program, the generated machine language code referencing the tables, wherein
the complier is configured to identify an arithmetic or logical expression in the first computer program, the expression depending on at least one variable and the code generator is configured to generate one or more tables representing pre-computed results of the identified expression for multiple values of the variable and to generate machine language code to implement the identified expression in the second computer program by accessing the generated one or more tables representing pre-computed results, wherein the one or more tables are generated according to:
generating bit-strings, the generated bit strings having a same size as a code-word bit size (n1) of a first error correcting code, the first error correcting code having a dimension of at least the input bit size (k10, and
for each decodable generated bit-string,
decoding the generated bit-string so as to obtain a decoded generated bit-string, the decoding corresponding to the first error correcting code,
applying an operator to the decoded generator bit-string, and
encoding a result of the operator to obtain a code word of a second error correcting code, optionally, adding at most a second error threshold number of bit errors to the code word, the second error threshold number being at most an error correcting capability (t2) of the second error correcting code, the second error correcting code having a dimension of at least the output bit size (k2), and mapping in the look-up table the decodable generated bit string to the encoded result of the operator including optional bit errors.

14. A method to compute a function of one or more inputs, the inputs having an input bit-size (k), the method comprising:
 storing one or more look -up tables, the look up tables mapping input values to output values, input values of a look up table having a bit size equal to a first code word bit size (n1) of a first error correcting code, the look up table being constructed with respect to a first error correcting code, a second error correcting code, a first error threshold and a second error threshold, such that any two input values that each differ at most a first error threshold number of bits with a same code word of the first error correcting code, are mapped to respective output values that each differ at most a second error threshold number of bits with a same code word of the second error correcting code, wherein the first error threshold is at least 1 and at most an error correcting capability (t1) of the first error correcting code, and the second error threshold is at most an error correcting capability (t2) of the second error correcting code
 using the one or more look up tables in computing the function comprising applying the one or more look up tables to encoded values.

15. A non-transitory computer-readable storage medium encoded with a computer program comprising computer program code means for causing a computer to perform the method comprising:
 generating bit-strings, the generated bit strings having a same size as a code-word bit size (n1) of a first error correcting code, the first error correcting code having a dimension of at least the input bit size (k10, and
 for each decodable generated bit-string,
  decoding the generated bit-string so as to obtain a decoded generated bit-string, the decoding corresponding to the first error correcting code,
  applying an operator to the decoded generator bit-string, and
  encoding a result of the operator to obtain a code word of a second error correcting code, optionally, adding at most a second error threshold number of bit errors to the code word, the second error threshold number being at most an error correcting capability (t2) of the second error correcting code, the second error correcting code having a dimension of at least the output bit size (k2), and
  mapping in the look-up table the decodable generated bit string to the encoded result of the operator including optional bit errors.

* * * * *